US012623608B2

(12) United States Patent
Zhou

(10) Patent No.: US 12,623,608 B2
(45) Date of Patent: May 12, 2026

(54) MULTIFUNCTIONAL DOUBLE-LAYER LIFT-TYPE VEHICLE-MOUNTED TENT

(71) Applicant: WILD LAND OUTDOOR GEAR LTD., Xiamen (CN)

(72) Inventor: Nanqing Zhou, Xiamen (CN)

(73) Assignee: WILD LAND OUTDOOR GEAR LTD., Xiamen (CN)

( * ) Notice: Subject to any disclaimer, the term of this patent is extended or adjusted under 35 U.S.C. 154(b) by 68 days.

(21) Appl. No.: 18/674,837

(22) Filed: May 25, 2024

(65) Prior Publication Data

US 2025/0153650 A1 May 15, 2025

(30) Foreign Application Priority Data

Nov. 14, 2023 (CN) .......................... 202311516413.0
Jan. 26, 2024 (CN) .......................... 202410115644.9

(51) Int. Cl.
*B60R 9/045* (2006.01)

(52) U.S. Cl.
CPC .................................... *B60R 9/045* (2013.01)

(58) Field of Classification Search
CPC ... B60J 7/1614; B60P 3/32; B60P 3/34; B60P 3/341; B60P 3/38; B60R 9/045; B66F 3/22; E04H 15/06; E04H 15/30; E04H 15/44; E04H 15/46; E04H 15/48; E04H 15/50
USPC ........................................................ 224/321
See application file for complete search history.

(56) References Cited

U.S. PATENT DOCUMENTS 3,575,460 A * 4/1971 Kennedy ................... B60P 3/38
5/8

FOREIGN PATENT DOCUMENTS

| AU | 2021104444 | A4 | | 9/2021 | | |
|----|------------|-----|---|--------|---|---|
| CN | 205233885 | U | | 5/2016 | | |
| CN | 205358936 | U | | 7/2016 | | |
| CN | 106013943 | A | * | 10/2016 | ............. | E04H 15/54 |
| CN | 109667466 | A | | 4/2019 | | |
| CN | 214874549 | U | | 11/2021 | | |
| CN | 218623632 | U | | 3/2023 | | |

(Continued)

OTHER PUBLICATIONS

CN-106013943-A Translation, Zhou, Nan-qing, Oct. 12, 2016 (Year: 2016).*

(Continued)

*Primary Examiner* — Nathan J Newhouse
*Assistant Examiner* — Matthew T Theis
(74) *Attorney, Agent, or Firm* — Syncoda LLC; Feng Ma

(57) ABSTRACT

A multifunctional double-layer lift-type vehicle-mounted tent comprises a base frame, a first top frame, a second top frame, a first scissor-type lifting frame, a second scissor-type lifting frame and a drive mechanism; wherein a lower end of the first scissor-type lifting frame is pivotally connected to the base frame; an upper end of the second scissor-type lifting frame is pivotally connected to the second top frame; an upper end of the first scissor-type lifting frame is pivotally connected to a lower end of the second scissor-type lifting frame, and both are pivotally connected to the first top frame, so that the first scissor-type lifting frame and the second scissor-type lifting frame are linked; and the drive mechanism drives the first scissor-type lifting frame and the second scissor-type lifting frame of the linked lifting frame to be unfolded upwards or folded downwards.

17 Claims, 8 Drawing Sheets

(56)          References Cited

FOREIGN PATENT DOCUMENTS

| CN | 219754445 | U | 9/2023 | |
| CN | 219910256 | U | 10/2023 | |
| CN | 117027537 | A | 11/2023 | |
| CN | 219993322 | U | 11/2023 | |
| CN | 117400836 | A | 1/2024 | |
| CN | 118025023 | A | 5/2024 | |
| CN | 221623653 | U | 8/2024 | |
| CN | 221623654 | U | 8/2024 | |
| KR | 20170011132 | A | 2/2017 | |
| KR | 20180100921 | A | 9/2018 | |
| KR | 20220139695 | A | 10/2022 | |
| WO | WO-2022231185 | A1 * | 11/2022 | ............. E04H 15/46 |

OTHER PUBLICATIONS

WO-2022231185-A1 Translation, Park, Soon Gyu, Nov. 3, 2022 (Year: 2022).*

International Search Report in the international application No. PCT/CN2024/123638, mailed on Dec. 24, 2024.

* cited by examiner

MULTIFUNCTIONAL DOUBLE-LAYER LIFT-TYPE VEHICLE-MOUNTED TENT

REFERENCE TO RELATED APPLICATIONS

The present application claims the priorities of Chinese Patent Applications Nos. 202311516413.0 filed on 2023 Nov. 14, and 202410115644.9 filed on 2024 Jan. 26, the disclosures of which applications are incorporated herein by reference.

TECHNICAL FIELD

The present invention relates to the technical field of vehicle-mounted tents, and more particularly, to a multifunctional double-layer lift-type vehicle-mounted tent.

BACKGROUND ART

The vehicle-mounted tent refers to a bracket mounted on the roof of a vehicle so as to tie large items, and is the basis of all mounting schemes on the roof of the vehicle. The vehicle-mounted tents are most commonly used for self-driving travel, can be used to carry travel luggage and tents, increase space in vehicles, and can also carry other sports equipment such as skis, bicycles, sails, etc.

The existing lift-type vehicle-mounted tents are mostly single-layer platforms, and the accommodation space is relatively limited, which cannot meet larger space requirements. However, the existing lift-type vehicle-mounted tent with a double-layer structure is complicated in components for supporting and lifting the whole platform structure due to the large weight of the double-layer platform, resulting in a complicated structure, and heavy and poor practicality of the whole vehicle-mounted tent.

In order to solve the above problems, the present inventors have proposed a multifunctional double-layer lift-type vehicle-mounted tent having a large activity space and a simple and stable structure.

SUMMARY OF THE INVENTION

The object of the present invention is directed to provide a multifunctional double-layer lift-type vehicle-mounted tent, which is unfolded or folded by an upper and a lower double-layer lifting frame. The present invention has two layers of accommodation space after the unfolding, so as to satisfy a user's demand for a large activity space. In addition, two groups of scissor-fork lifting frames in a linked lifting frame share a drive mechanism. The structure is simple and the stability is high.

To achieve the above object, the solution of the present invention provides a multifunctional double-layer lift-type vehicle-mounted tent, including a base frame, a first top frame, a second top frame, a linked lifting frame and a drive mechanism, wherein the base frame is used for mounting on an automobile; the first top frame is located above the base frame, and the second top frame is located above the first top frame; the linked lifting frame comprises a first scissor-type lifting frame and a second scissor-type lifting frame; a lower end of the first scissor-type lifting frame is pivotally connected to the base frame; an upper end of the second scissor-type lifting frame is pivotally connected to the second top frame; an upper end of the first scissor-type lifting frame is pivotally connected to a lower end of the second scissor-type lifting frame, and both are pivotally connected to the first top frame, so that the first scissor-type lifting frame and the second scissor-type lifting frame are linked; and the drive mechanism drives the first scissor-type lifting frame and the second scissor-type lifting frame of the linked lifting frame to be raised and unfolded or lowered and retracted, thereby driving the first top frame and the second top frame to be raised and unfolded or lowered and retracted relative to the base frame.

Furthermore, the rear end of the multifunctional double-layer lift-type vehicle-mounted tent is provided with two groups of the linked lifting frames, wherein the two groups of the linked lifting frames are symmetrically arranged on left and right sides of the multifunctional double-layer lift-type vehicle-mounted tent, and each group of the linked lifting frames is driven to lift by a drive mechanism.

Furthermore, the drive mechanism is an electric telescopic rod which is lengthened or shortened for driving the same ends of two branches of the connected scissor-type lifting frame to approach or move away from each other, and also, driving the same ends of the two branches of the other scissor-type lifting frame to approach or move away from each other in a linkage manner, so that the first top frame and the second top frame are raised and unfolded or lowered and folded relative to the base frame. Further, the first scissor-type lifting frame comprises a first branch and a second branch; the second scissor-type lifting frame comprises a third branch and a fourth branch, wherein an upper end of the second branch is pivotally connected to a lower end of the third branch, with a pivot point being a movable pivot point A; the movable pivot point A is slidably arranged on the first top frame via a slider;

an upper end of the first branch is pivotally connected to a lower end of the fourth branch, with the pivot point being a fixed pivot point B; and the fixed pivot point B is fixed on the first top frame.

Further, the base frame is provided with a first slide rail with an opening faced upwards along the length direction thereof; a lower end of the second branch is fixedly and pivotally connected to one end of the first slide rail; and a lower end of the first branch is slidably arranged on the first slide rail via a first pulley block;

the second top frame is provided with a second slide rail with an opening faced downwards at a position corresponding to the first slide rail; an upper end of the third branch is fixedly and pivotally connected to one end of the second slide rail; and an upper end of the fourth branch is slidably arranged in the second slide rail via a second pulley block.

Further, the side surface of the first top frame is provided with a slide groove extending along the length direction thereof; and the movable pivot point A of the first scissor-type lifting frame and the second scissor-type lifting frame is slidably arranged on the slide groove via the slider.

Further, the output end of the electric telescopic rod is pivotally connected to the third branch; the fixed end of the electric telescopic rod is pivotally connected to the second branch; the electric telescopic rod is elongated, driving the upper and lower ends of the third branch to be respectively close to the upper and lower ends of the fourth branch to raise the second top frame, and also driving the upper and lower ends of the first branch to be respectively close to the upper and lower ends of the second branch to raise the first top frame; conversely, the electric telescopic rod is shortened to lower the second top frame and the first top frame.

Furthermore, a folding ladder is arranged between the base frame and the first top frame; the folding ladder comprises a first ladder frame and a second ladder frame, wherein a lower end of the first ladder frame is pivotally connected to the base frame; an upper end of the first ladder frame is pivotally connected to a lower end of the second ladder frame; an upper end of the second ladder frame is pivotally connected to the first top frame; and the first top frame is raised or lowered to drive the second ladder frame to be unfolded or folded relative to the first ladder frame.

Further, a folding platform is mounted on the first top frame; the folding platform comprises an intermediate bottom plate, a first side plate and a second side plate; the intermediate bottom plate is fixed on the first top frame; the first side plate and the second side plate are rotatably arranged at both sides of the intermediate bottom plate; the first side plate and the second side plate are stacked in sequence above the intermediate bottom plate after being turned over and folded;

a skylight is provided on the intermediate bottom plate; a slide cover is provided on the skylight, and the slide cover slides to open or close the skylight; a top cover is arranged above the second top frame; the periphery of the top cover has a cover edge, and the top cover and the cover edge form a storage space with an outer contour greater than or equal to the outer contour of the first top frame; the top cover is raised or lowered with the second top frame, and covered on the first top frame when the top cover is lowered into place; the folded second scissor-type lifting frame is hidden in the storage space; and the central portion of the top cover has an opening provided with a lid for opening or closing the opening.

Further, a detachable tent support frame for mounting a tent cloth is mounted on both sides of the first top frame; the tent support frame comprises a fixing rod and several supporting rods rotating around one axis of the fixing rod; when the tent cloth needs to be installed, the supporting rods are unfolded outwards from the fixing rods to different angles for the tent cloth to be installed; and each of the supporting rods is folded towards the fixing rod to complete storage when the folding is required.

With the above solutions, the present invention has the following beneficial effects.

The lifting of the multifunctional double-layer lift-type vehicle-mounted tent of the present invention is realized by at least one set of linked lifting frames and a drive mechanism. A first scissor-type lifting frame is supported between a base frame and a first top frame. A second scissor-type lifting frame is linked with the first scissor-type lifting frame and is supported between the first top frame and the second top frame. The drive mechanism drives the first scissor-type lifting frame and the second scissor-type lifting frame of the linked lifting frame to be raised and unfolded or lowered and retracted, thereby driving the first top frame and the second top frame to be raised and unfolded or lowered and retracted relative to the base frame.

The multifunctional double-layer lift-type vehicle-mounted tent of the present invention is mainly used for being mounted on a rear hopper of a pickup truck. The base frame is mounted on the rear hopper of the automobile. When in a folded state, the space between the first top frame and the rear hopper of the automobile can be used for storing luggages. A first activity space is formed between the first top frame and the rear hopper of the automobile after the unfolding, and a second activity space is formed between the first top frame and the second top frame, namely, an upper and lower double-layer activity space is formed.

In the present invention, two scissor-type lifting frames in a group of linked lifting frames share one drive mechanism, which greatly saves the arrangement of parts and makes the whole multifunctional double-layer lift-type vehicle-mounted tent structure simpler.

In addition, the folding ladder connected with the base frame and the first top frame is unfolded while the first top frame is raised, and is supported between the base frame and the first top frame, so that the user can climb and it can serve as a supporting member to improve the stability of the integral structure of the multifunctional double-layer lift-type vehicle-mounted tent.

Figure 1:
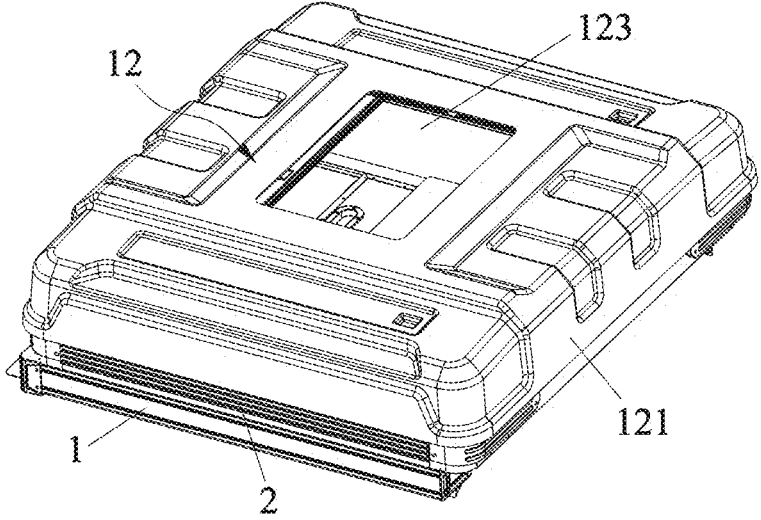
FIG. 1 is a (top) view illustrating a folded state of a multifunctional double-layer lift-type vehicle-mounted tent according to an embodiment of the present invention.

DESCRIPTION OF REFERENCE NUMERALS 1, base frame; 11, first slide rail; 2, first top frame; 21, slide groove; 3, second top frame; 31, second slide rail; 4, first scissor-type lifting frame; 41, first branch; 42, second branch; 5, second scissor-type lifting frame; 51, third branch; 52, fourth branch; 6, electric telescopic rod; 7, folding ladder; 71, first ladder frame; 72, second ladder frame; 8, folding platform; 81, intermediate bottom plate; 82, first side plate; 83, second side plate; 9, skylight; 10, slide cover; 12, top cover; 121, cover edge; 122, crossbar; 123, opening; 13, first pulley block; 14, second pulley block; 15, synchronization rod; 16, contact switch; 17, tent support frame; 171, fixing rod; 172, supporting rod.

DETAILED DESCRIPTION OF THE INVENTION

The present invention will now be described in detail with reference to specific embodiments and accompanying drawings.

The present invention provides a multifunctional double-layer lift-type vehicle-mounted tent, as shown in FIGS. 1 to 8, including a base frame 1, a first top frame 2, a second top frame 3, a linked lifting frame, a drive mechanism and a folding ladder 7. The base frame 1 is used for mounting on an automobile, mainly a rear hopper of a pickup truck. There are various mounting methods for the base frame 1 and the rear hopper of the automobile. According to the mounting method provided in this embodiment, a mounting hole is provided on the base frame 1, and the base frame 1 and the rear hopper of the automobile may be fixed in a locking manner by means of bolts or other locking members. The base frame 1 and the rear hopper of the automobile may also be mounted in a sliding manner by means of a slide rail.

The first top frame 2 is located above the base frame 1 and the second top frame 3 is located above the first top frame 2. The linked lifting frame is used for raising or lowering the first top frame 2 and the second top frame 3. When raised, a first activity space is formed between the base frame 1 and the first top frame 2, and a second activity space is formed between the first top frame 2 and the second top frame 3, so as to form a multifunctional double-layer lift-type vehicle-mounted tent having a double-layer accommodation space. When lowered, the first top frame 2 and the second top frame 3 are sequentially folded over the base frame 1.

Figure 3:
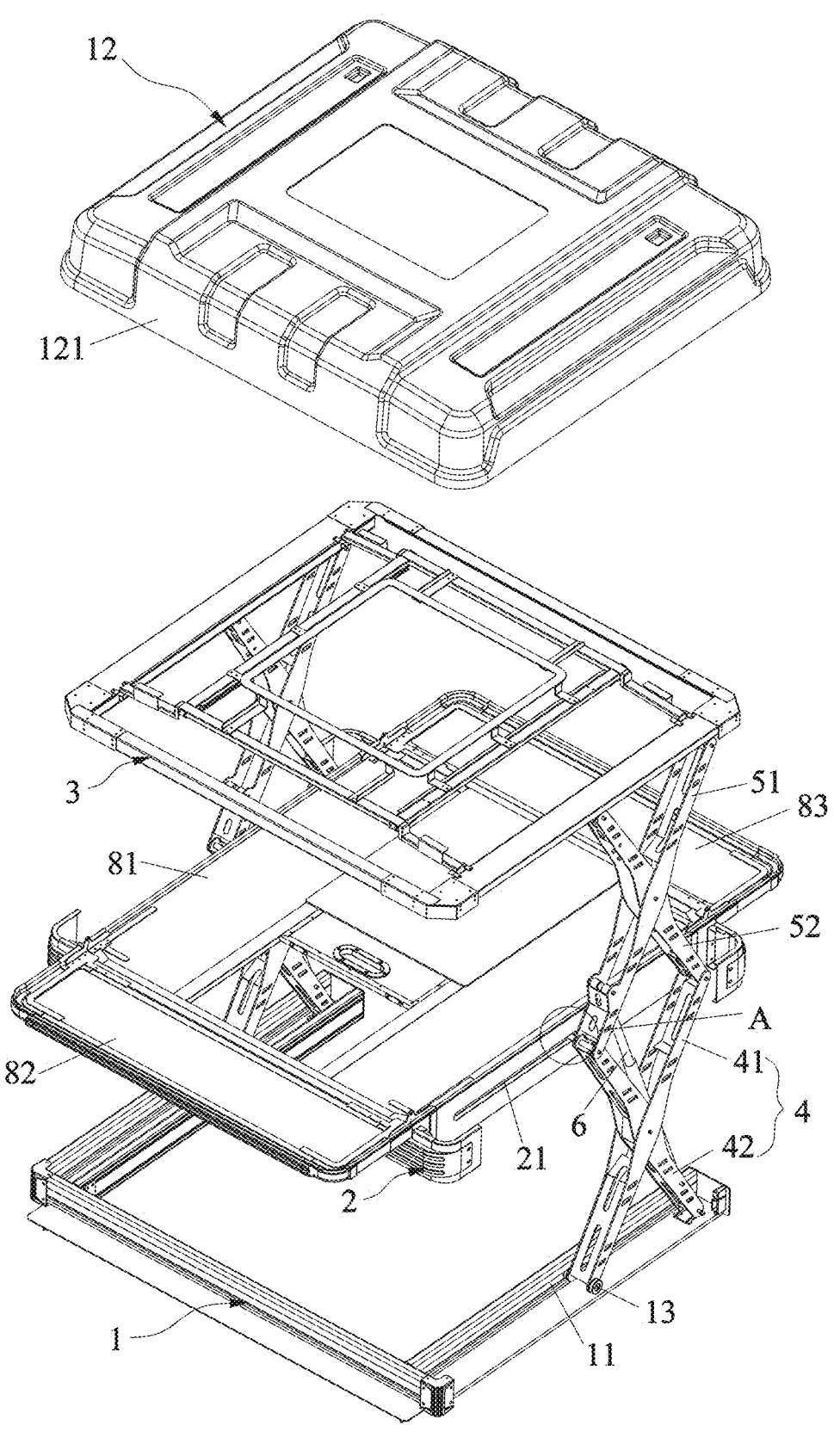
FIG. 3 is a perspective view illustrating an unfolded state of a multifunctional double-layer lift-type vehicle-mounted tent according to an embodiment of the present invention.
Figure 4:
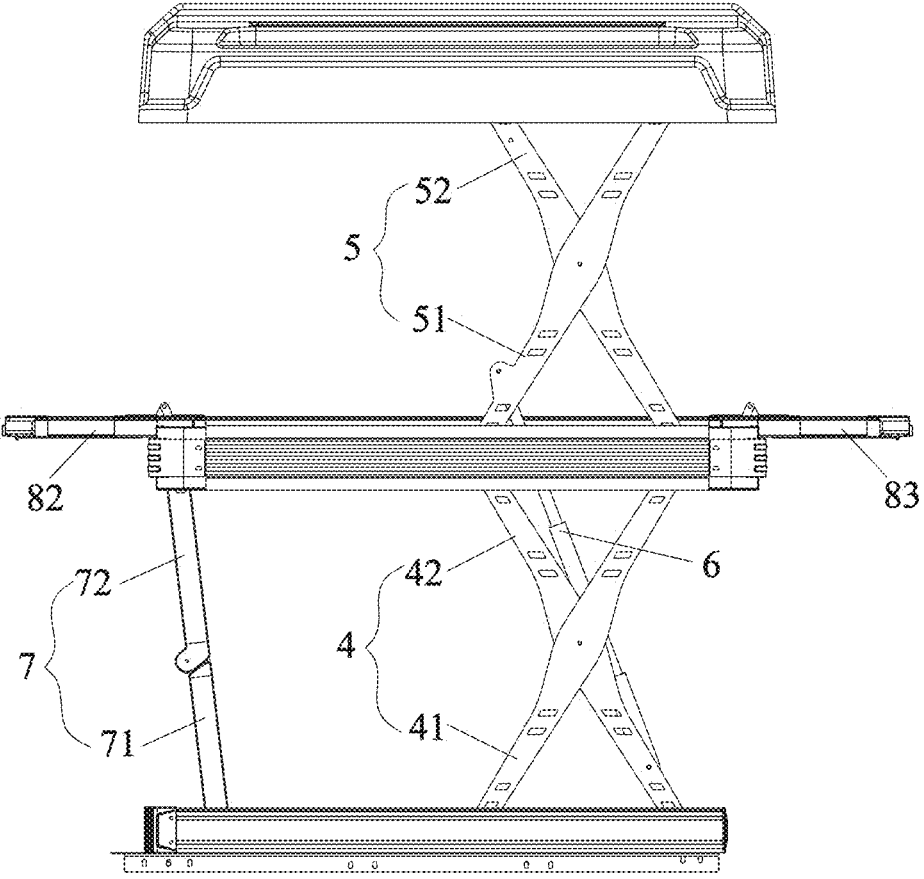
FIG. 4 is a side view illustrating an unfolded state of a multifunctional double-layer lift-type vehicle-mounted tent according to an embodiment of the present invention.

With particular reference to FIGS. 3 and 4, the linked lifting frame includes a first scissor-type lifting frame 4 and a second scissor-type lifting frame 5 which are linked. A lower end of the first scissor-type lifting frame 4 is pivotally connected to the base frame 1. An upper end of the second scissor-type lifting frame 5 is pivotally connected to the second top frame 3. An upper end of the first scissor-type lifting frame 4 is pivotally connected to a lower end of the second scissor-type lifting frame 5, and both are pivotally connected to the first top frame 2, so that the first scissor-type lifting frame 4 and the second scissor-type lifting frame 5 are linked.

In the present embodiment, the rear end of the multifunctional double-layer lift-type vehicle-mounted tent is provided with two groups of the linked lifting frames, and the two groups of linked lifting frames are symmetrically arranged on the left and right sides of the multifunctional double-layer lift-type vehicle-mounted tent respectively, so that the structure of the whole multifunctional double-layer lift-type vehicle-mounted tent is more stable.

Figure 5:
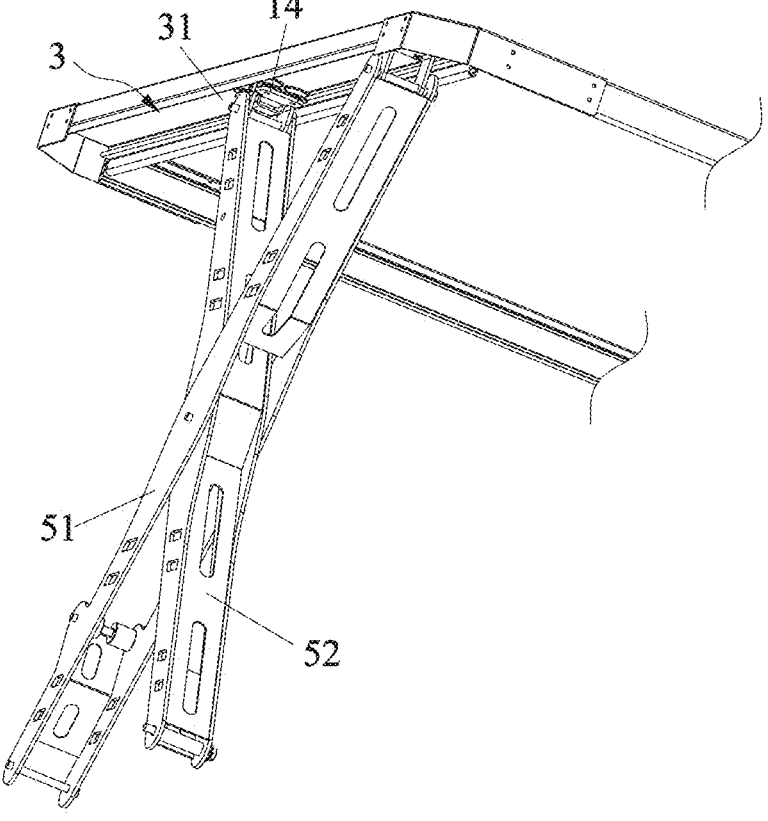
FIG. 5 is a schematic view showing the structure of a second top frame and a second scissor-type lifting frame according to an embodiment of the present invention.

The specific structure and linkage relationship of the first scissor-type lifting frame 4 and the second scissor-type lifting frame 5 are as follows. As shown in FIGS. 3 and 4, the first scissor-type lifting frame 4 includes a first branch 41 and a second branch 42, and the second scissor-type lifting frame 5 includes a third branch 51 and a fourth branch 52. As shown in FIG. 3, the base frame 1 is provided with a first slide rail 11 with an opening faced upwards along the length direction thereof. As shown in FIG. 5, the second top frame 3 is provided with a second slide rail 31 with an opening faced downwards at a position corresponding to the first slide rail 11. As shown in FIG. 3, the side surface of the first top frame 2 is provided with a slide groove 21 extending along the length direction of the first top frame 2 and penetrating left and right.

The lower end of the second branch 42 is fixedly and pivotally connected to the first slide rail 11. The upper end of the third branch 51 is fixedly and pivotally connected to the second slide rail 31. The upper end of the second branch 42 is pivotally connected to the lower end of the third branch 51. The pivot point is a movable pivot point A (as shown in FIG. 3). The movable pivot point A is connected to a slider which is arranged in the slide groove 21 of the first top frame

2 and can slide along the slide groove 21, thereby enabling the movable pivot point A to be slidably arranged on the first top frame 2.

Figure 8:
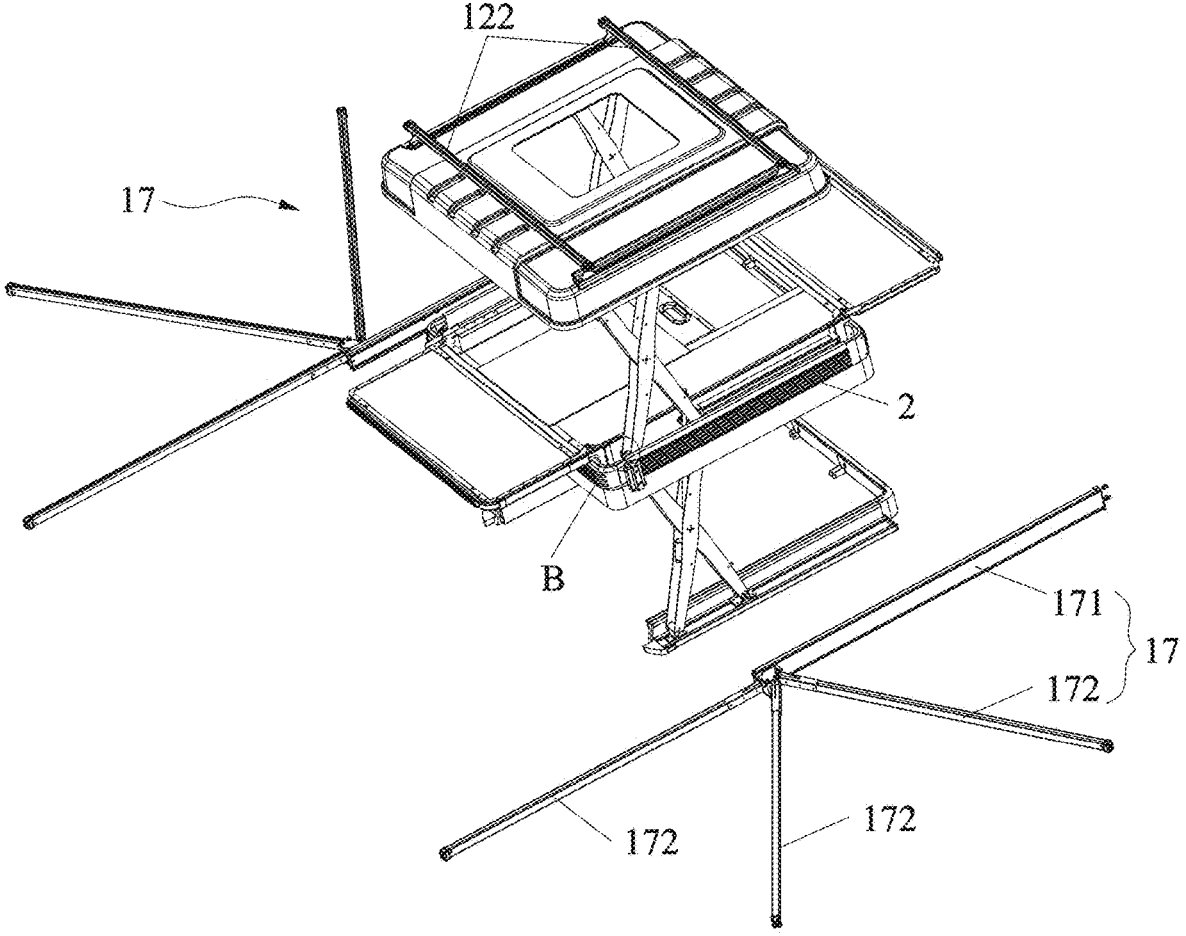
FIG. 8 is a view illustrating an unfolded state of a tent support frame according to an embodiment of the present invention.

A first pulley block 13 is pivotally connected to the lower end of the first branch 41, and the first branch 41 is slidably arranged on the first slide rail 11 of the base frame 1 via the first pulley block 13. The upper end of the fourth branch 52 is pivotally connected to the second pulley block 14, and the fourth branch 52 is slidably arranged on the second slide rail 31 of the second top frame 3 via the second pulley block 14. Furthermore, the upper end of the first branch 41 is pivotally connected to the lower end of the fourth branch 52, with the pivot point being a fixed pivot point B (as shown in FIG. 8). The fixed pivot point B is fixed on the first top frame 2 and is located in the sliding direction of the movable pivot point A. To this end, the first scissor-type lifting frame 4 and the second scissor-type lifting frame 5 are linked to each other to form a lifting structure.

In the present invention, a drive mechanism is correspondingly provided for each set of linked lifting frames, namely. Two scissor-type lifting frames in each set of linked lifting frames share one drive mechanism, and the drive mechanism can be an electrodynamic type, a pneumatic type, etc. In the present embodiment, an electric telescopic rod 6 is selected as the drive mechanism. The electric telescopic rod 6 telescopically drives the connected scissor-type lifting frame to be unfolded upwards or folded downwards while driving another scissor-type lifting frame to be unfolded upwards or folded downwards, so as to raise or lower the first top frame 2 and the second top frame 3 relative to the base frame 1.

In this embodiment, as shown in FIG. 3, the fixed end of the electric telescopic rod 6 is pivotally connected to the second branch 42, and the output end of the electric telescopic rod 6 is pivotally connected to the third branch 51. When it is necessary to unfold the multifunctional double-layer lift-type vehicle-mounted tent, the electric telescopic rod 6 is controlled to start for extension, driving the lower end of the third branch 51 to be close to the lower end of the fourth branch 52 and the upper end of the fourth branch 52 to be close to the upper end of the third branch 51, so that the second top frame 3 rises. At the same time, it drives the upper end of the first branch 41 to be close to the upper end of the second branch 42 and the lower end of the first branch 41 to be close to the lower end of the second branch 42, so that the first top frame 2 rises. When the first top frame 2 and the second top frame 3 rise in place, the electric telescopic rod 6 stops extending. On the contrary, the electric telescopic rod 6 is shortened to lower the second top frame 3 and the first top frame 2 to achieve folding. The two scissor-type lifting frames in each group of linked lifting frames share a drive mechanism, which not only reduces the use of parts, but also makes the whole multifunctional double-layer lift-type vehicle-mounted tent structure simpler and more convenient to unfold and fold.

Figure 2:
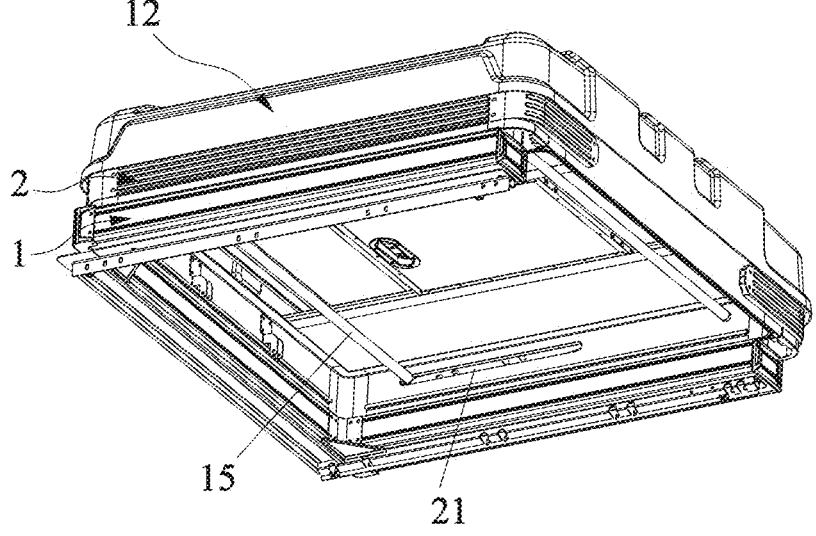
FIG. 2 is a (bottom) view illustrating a folded state of a multifunctional double-layer lift-type vehicle-mounted tent according to an embodiment of the present invention.

In addition, the movable pivot points A on the left and right sides of the first top frame 2 are linked by a synchronization rod 15. As shown in FIG. 2, the synchronization rod 15 respectively passes through the slide grooves 21 on the left and right sides and is connected to the movable pivot points A on the both sides. The function of the synchronization rod 15 is mainly to realize the linkage of the movable pivot points A on the left and right sides. In particular, when the movable pivot points A on both sides are moved, the synchronization rod 15 can ensure that the positions and movement states of the movable pivot points A on both sides are kept consistent, thereby improving the stability and coordination of the entire mechanism.

Figure 7:
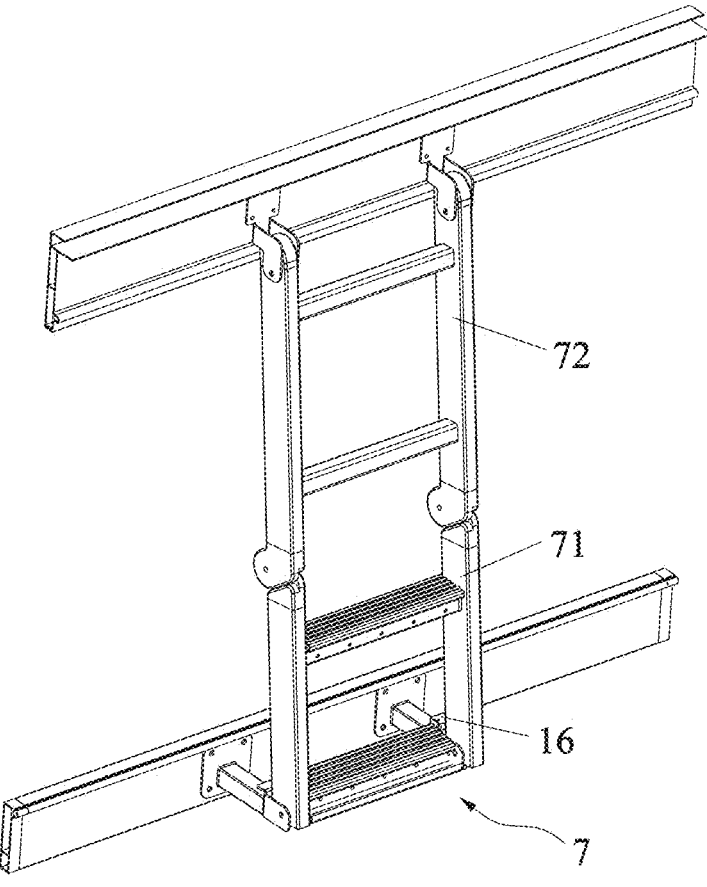
FIG. 7 is a schematic view showing the structure of a folding ladder according to an embodiment of the present invention.

With particular reference to FIGS. 4 and 7, in order to facilitate a user to board a second floor platform, a folding ladder 7 is provided between the base frame 1 and the first top frame 2 of the multifunctional double-layer lift-type vehicle-mounted tent of the present invention. In the present embodiment, the folding ladder 7 is located at a front end of the multifunctional double-layer lift-type vehicle-mounted tent and at a side of the multifunctional double-layer lift-type vehicle-mounted tent near to the vehicle head. The folding ladder 7 is unfolded following the rising of the first top frame 2 and supported between the base frame 1 and the first top frame 2, or folded following the falling of the first top frame 2 between the base frame 1 and the first top frame 2. Specifically, the folding ladder 7 includes a first ladder frame 71 and a second ladder frame 72. The upper end of the first ladder frame 71 is pivotally connected to the lower end of the second ladder frame 72. The lower end of the first ladder frame 71 is pivotally connected to the base frame 1. The upper end of the second ladder frame 72 is pivotally connected to the first top frame 2. A locking device (not shown in the figure) is provided at the pivotal connection of the first ladder frame 71 and the second ladder frame 72. A contact switch 16 is provided at the front end of the first ladder frame 71.

When the first top frame 2 rises, the second ladder frame 72 is driven to unfold relative to the first ladder frame 71. At this moment, the first ladder frame 71 and the second ladder frame 72 are not fully unfolded, and the included angle between the two does not reach 180°. The manual pressing is required to enable the first ladder frame 71 and the second ladder frame 72 to fully expand to the included angle of 180°. At this moment, the contact switch 16 at the front end of the first ladder frame 71 contacts the front part of the multifunctional double-layer lift-type vehicle-mounted tent or the vehicle body to trigger the switch, so that the folding ladder 7 is automatically locked and the whole folding ladder cannot be folded at will. If the folding ladder 7 needs to be folded, the locking device is unlocked firstly, and the ladder frame is pulled outwards to make the ladder frame slightly folded, so that the ladder frame does not contact the contact switch 16, and the unlocked first ladder frame 71 and second ladder frame 72 may be folded downwards following the first top frame 2. The unfolded climbing ladder can be also used for the user to climb, and also serves to support the base frame 1 and the first top frame 2, thereby improving the stability of the multifunctional double-layer lift-type vehicle-mounted tent structure. On the contrary, when the first top frame 2 descends, the second ladder frame 72 is driven to be folded with respect to the first ladder frame 71, and the whole folding ladder 7 is folded between the base frame 1 and the first top frame 2, so as to reduce the occupation of the roof space, and at the same time reduce the wind resistance during driving and improve driving safety.

Figure 6:
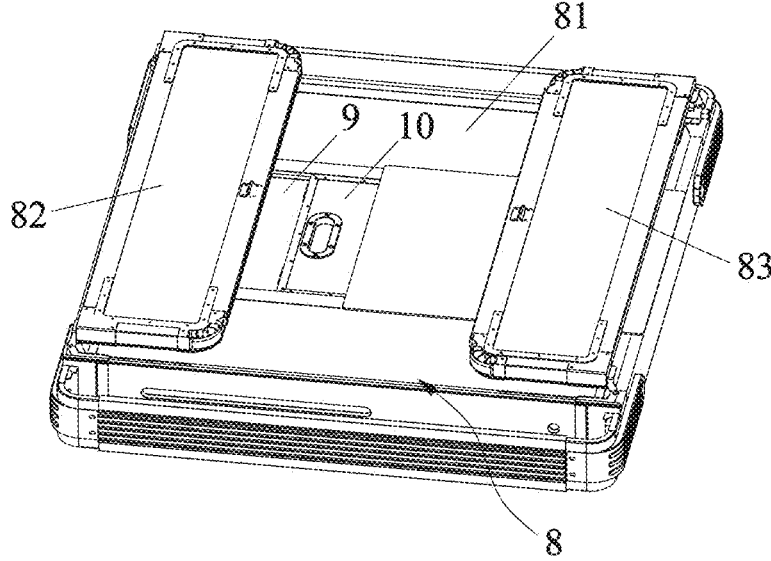
FIG. 6 is a view illustrating a folded state of a folding platform according to an embodiment of the present invention.

With particular reference to FIGS. 3, 4 and 6, a folding platform 8 is mounted on the first top frame 2. The folding platform 8 includes an intermediate bottom plate 81, a first side plate 82 and a second side plate 83. The intermediate bottom plate 81 is fixed on the first top frame 2. The size of the intermediate bottom plate 81 is the same as that of the first top frame. The first side plate 82 and the second side plate 83 are respectively rotatably connected to both sides of the intermediate bottom plate 81. When the range of motion needs to be expanded, the first side plate 82 and the second side plate 83 are unfolded to both sides, so that the two side plates are in the same plane as the intermediate bottom plate

81, and thus the moving space of the platform can be expanded. The first side plate 82 and the second side plate 83 are folded towards the middle bottom plate 81, so that the two side plates are stacked above the middle bottom plate 81, i.e., the folding of the folding platform 8 is achieved.

A tent support frame 17 for mounting a tent cloth is mounted on both sides of the first top frame 2. A space for a user to move and rest can be built on both sides of the vehicle. The tent support frame 17 includes a fixing rod 171 detachably installed at a side of the first top frame 2 and a plurality of supporting rods 172 rotating around one axis of the fixing rod 171. When it is necessary to install the tent cloth, the supporting rods 172 may be unfolded outwards from the fixing rods 171 to different angles for the tent cloth to be installed. When the folding is required, each of the supporting rods 172 is folded towards the fixing rod 171 to complete the storage. The entire tent support frame 17 mount the tent cloth, and the entire tent support frame 17 may be detached from the first top frame 2.

In addition, as shown in FIG. 6, a skylight 9 is provided on the intermediate bottom plate 81. A slide cover 10 is provided on the skylight 9. The slide cover 10 slides to open or close the skylight 9. The folding ladder 7 is located at the skylight 9. After the user reaches the skylight 9 through the folding ladder 7, the activity area of the folding platform 8 is accessible through the skylight 9.

As shown in FIGS. 1 and 2, a top cover 12 is provided above the second top frame 3. The periphery of the top cover 12 has a cover edge 121. The top cover 12 and the cover edge 121 form a storage space with an outer contour greater than or equal to the outer contour of the first top frame 2. The top cover 12 is raised or lowered following the second top frame 3. When the top cover 12 is lowered into place, and the top cover 12 is closed over the base frame 1, the first top frame 2 and the second top frame 3. At the same time, the linked lifting frame, the folding platform 8 and the electric telescopic rod 6 are all hidden in the storage space formed by the top cover 12 and the cover edge 121. The top cover 12 has an opening 123 in the middle thereof, and a flexible lid (not shown) is provided at the opening 123 so that a user can selectively open or close the cover. When the cover is opened, the opening 123 becomes a functional window, which can not only enhance the lighting in the tent and make the inner space more bright and comfortable, but also promote the ventilation in the tent so as to effectively discharge the damp and dirty air and keep the inner environment fresh. In addition, this opening 123 provides a more versatile experience for the user. At night, the user may lie in the tent, enjoy a beautiful starry sky through the opening 123, and feel a charm of the nature. This opening 123 also provides an excellent shooting angle for the camera enthusiasts who can stretch forwards from the tent and catch the outside scenery.

As shown in FIG. 8, two crossbars 122 are provided above the top cover 12 for mounting items such as luggage, bicycles, etc.

To further illustrate the embodiments, the invention is provided with drawings. The accompanying drawings, which are incorporated in and constitute a part of this disclosure, illustrate embodiments and, together with the description, serve to explain the principles of operation of the embodiments. With these references in mind, one of ordinary skill in the art will appreciate other possible embodiments and advantages of the present invention. Elements in the figures are not drawn to scale, and like reference numerals are generally used to indicate like elements.

Meanwhile, the front, rear, left and right orientations involved in the embodiment are merely used as a reference for one orientation, and do not represent the orientation in practical use. Furthermore, the terms "first", "second", "third", and the like are used solely for descriptive purposes and are not to be construed as indicating or implying relative importance.

The above is only preferred embodiments of the invention and is not a limitation on the design of the present invention. Any equivalent change made in accordance with the design key of the present invention will fall within the scope of protection of the present invention.

The invention claimed is:

1. A multifunctional double-layer lift-type vehicle-mounted tent, comprising a base frame, a first top frame, a second top frame, a linked lifting frame and a drive mechanism, wherein the base frame is used for mounting on an automobile; the first top frame is located above the base frame, and the second top frame is located above the first top frame; the linked lifting frame comprises a first scissor-type lifting frame and a second scissor-type lifting frame; a lower end of the first scissor-type lifting frame is pivotally connected to the base frame; an upper end of the second scissor-type lifting frame is pivotally connected to the second top frame; an upper end of the first scissor-type lifting frame is pivotally connected to a lower end of the second scissor-type lifting frame, and both are pivotally connected to the first top frame, so that the first scissor-type lifting frame and the second scissor-type lifting frame are linked; and the drive mechanism drives the first scissor-type lifting frame and the second scissor-type lifting frame of the linked lifting frame to be raised and unfolded or lowered and retracted, thereby driving the first top frame and the second top frame to be raised and unfolded or lowered and retracted relative to the base frame; and a folding ladder configured to be climbed by a user is connected to the base frame and the first top frame.

2. The multifunctional double-layer lift-type vehicle-mounted tent according to claim 1, wherein the rear end of the multifunctional double-layer lift-type vehicle-mounted tent is provided with two groups of the linked lifting frames, wherein the two groups of the linked lifting frames are symmetrically arranged on left and right sides of the multifunctional double-layer lift-type vehicle-mounted tent, and each group of the linked lifting frames is driven to lift by a drive mechanism.

3. The multifunctional double-layer lift-type vehicle-mounted tent according to claim 2, wherein the drive mechanism is an electric telescopic rod which is lengthened or shortened for driving upper ends or low ends of two branches of the connected scissor-type lifting frame to approach or move away from each other, and also, driving upper ends or low ends of the two branches of the other scissor-type lifting frame to approach or move away from each other in a linkage manner, so that the first top frame and the second top frame are raised and unfolded or lowered and folded relative to the base frame.

4. The multifunctional double-layer lift-type vehicle-mounted tent according to claim 3, wherein the first scissor-type lifting frame comprises a first branch and a second branch; the second scissor-type lifting frame comprises a third branch and a fourth branch, wherein an upper end of the second branch is pivotally connected to a lower end of the third branch, with a pivot point being a movable pivot point A; the movable pivot point A is slidably arranged on the first top frame via a slider;

an upper end of the first branch is pivotally connected to a lower end of the fourth branch, with the pivot point being a fixed pivot point B; and the fixed pivot point B is fixed on the first top frame.

5. The multifunctional double-layer lift-type vehicle-mounted tent according to claim 4, wherein the base frame is provided with a first slide rail with an opening faced upwards along the length direction thereof; a lower end of the second branch is fixedly and pivotally connected to one end of the first slide rail; and a lower end of the first branch is slidably arranged on the first slide rail via a first pulley block;

the second top frame is provided with a second slide rail with an opening faced downwards at a position corresponding to the first slide rail; an upper end of the third branch is fixedly and pivotally connected to one end of the second slide rail; and an upper end of the fourth branch is slidably arranged in the second slide rail via a second pulley block.

6. The multifunctional double-layer lift-type vehicle-mounted tent according to claim 5, wherein the side surface of the first top frame is provided with a slide groove extending along the length direction thereof; and the movable pivot point A of the first scissor-type lifting frame and the second scissor-type lifting frame is slidably arranged on the slide groove via the slider.

7. The multifunctional double-layer lift-type vehicle-mounted tent according to claim 4, wherein the output end of the electric telescopic rod is pivotally connected to the third branch; the fixed end of the electric telescopic rod is pivotally connected to the second branch; the electric telescopic rod is elongated, driving the upper and lower ends of the third branch to be respectively close to the upper and lower ends of the fourth branch to raise the second top frame, and also driving the upper and lower ends of the first branch to be respectively close to the upper and lower ends of the second branch to raise the first top frame; conversely, the electric telescopic rod is shortened to lower the second top frame and the first top frame.

8. The multifunctional double-layer lift-type vehicle-mounted tent according to claim 1, wherein the drive mechanism is an electric telescopic rod which is lengthened or shortened for driving upper ends or low ends of two branches of the connected scissor-type lifting frame to approach or move away from each other, and also, driving upper ends or low ends of the two branches of the other scissor-type lifting frame to approach or move away from each other in a linkage manner, so that the first top frame and the second top frame are raised and unfolded or lowered and folded relative to the base frame.

9. The multifunctional double-layer lift-type vehicle-mounted tent according to claim 8, wherein the first scissor-type lifting frame comprises a first branch and a second branch; the second scissor-type lifting frame comprises a third branch and a fourth branch, wherein an upper end of the second branch is pivotally connected to a lower end of the third branch, with a pivot point being a movable pivot point A; the movable pivot point A is slidably arranged on the first top frame via a slider;

an upper end of the first branch is pivotally connected to a lower end of the fourth branch, with the pivot point being a fixed pivot point B; and the fixed pivot point B is fixed on the first top frame.

10. The multifunctional double-layer lift-type vehicle-mounted tent according to claim 9, wherein the base frame is provided with a first slide rail with an opening faced upwards along the length direction thereof; a lower end of the second branch is fixedly and pivotally connected to one end of the first slide rail; and a lower end of the first branch is slidably arranged on the first slide rail via a first pulley block;

the second top frame is provided with a second slide rail with an opening faced downwards at a position corresponding to the first slide rail; an upper end of the third branch is fixedly and pivotally connected to one end of the second slide rail; and an upper end of the fourth branch is slidably arranged in the second slide rail via a second pulley block.

11. The multifunctional double-layer lift-type vehicle-mounted tent according to claim 10, wherein the side surface of the first top frame is provided with a slide groove extending along the length direction thereof; and the movable pivot point A of the first scissor-type lifting frame and the second scissor-type lifting frame is slidably arranged on the slide groove via the slider.

12. The multifunctional double-layer lift-type vehicle-mounted tent according to claim 9, wherein the output end of the electric telescopic rod is pivotally connected to the third branch; the fixed end of the electric telescopic rod is pivotally connected to the second branch; the electric telescopic rod is elongated, driving the upper and lower ends of the third branch to be respectively close to the upper and lower ends of the fourth branch to raise the second top frame, and also driving the upper and lower ends of the first branch to be respectively close to the upper and lower ends of the second branch to raise the first top frame; conversely, the electric telescopic rod is shortened to lower the second top frame and the first top frame.

13. The multifunctional double-layer lift-type vehicle-mounted tent according to claim 1, wherein the folding ladder comprises a first ladder frame and a second ladder frame, wherein a lower end of the first ladder frame is pivotally connected to the base frame; an upper end of the first ladder frame is pivotally connected to a lower end of the second ladder frame; an upper end of the second ladder frame is pivotally connected to the first top frame; and the first top frame is raised or lowered to drive the second ladder frame to be unfolded or folded relative to the first ladder frame.

14. The multifunctional double-layer lift-type vehicle-mounted tent according to claim 1, wherein a folding platform is mounted on the first top frame; the folding platform comprises an intermediate bottom plate, a first side plate and a second side plate; the intermediate bottom plate is fixed on the first top frame; the first side plate and the second side plate are rotatably arranged at both sides of the intermediate bottom plate; the first side plate and the second side plate are stacked in sequence above the intermediate bottom plate after being turned over and folded;

a skylight is provided on the intermediate bottom plate; a slide cover is provided on the skylight, and the slide cover slides to open or close the skylight; a top cover is arranged above the second top frame; the periphery of the top cover has a cover edge, and the top cover and the cover edge form a storage space with an outer contour greater than or equal to the outer contour of the first top frame; the top cover is raised or lowered with the second top frame, and covered on the first top frame when the top cover is lowered into place; the folded second scissor-type lifting frame is hidden in the storage space; and the central portion of the top cover has an opening provided with a lid for opening or closing the opening.

15. The multifunctional double-layer lift-type vehicle-mounted tent according to claim 1, wherein a detachable tent support frame for mounting a tent cloth is mounted on two opposite sides of the first top frame; the tent support frame comprises a fixing rod and several supporting rods rotating around one axis of the fixing rod; when the tent cloth needs to be installed, the supporting rods are unfolded outwards from the fixing rods to different angles for the tent cloth to be installed; and each of the supporting rods is folded towards the fixing rod to complete storage when the folding is required.

16. A multifunctional double-layer lift-type vehicle-mounted tent, comprising a base frame, a first top frame, a second top frame, a linked lifting frame and a drive mechanism, wherein the base frame is used for mounting on an automobile; the first top frame is located above the base frame, and the second top frame is located above the first top frame; the linked lifting frame comprises a first scissor-type lifting frame and a second scissor-type lifting frame; a lower end of the first scissor-type lifting frame is pivotally connected to the base frame; an upper end of the second scissor-type lifting frame is pivotally connected to the second top frame; an upper end of the first scissor-type lifting frame is pivotally connected to a lower end of the second scissor-type lifting frame, and both are pivotally connected to the first top frame, so that the first scissor-type lifting frame and the second scissor-type lifting frame are linked;

the drive mechanism drives the first scissor-type lifting frame and the second scissor-type lifting frame of the linked lifting frame to be raised and unfolded or lowered and retracted, thereby driving the first top frame and the second top frame to be raised and unfolded or lowered and retracted relative to the base frame;

a folding ladder configured to be climbed by a user is connected to the base frame and the first top frame, and is supported between the base frame and the first top frame;

a folding platform is mounted on the first top frame; the folding platform comprises an intermediate bottom plate, a first side plate and a second side plate; the intermediate bottom plate is fixed on the first top frame; the first side plate and the second side plate are rotatably arranged at both sides of the intermediate bottom plate; the first side plate and the second side plate are stacked in sequence above the intermediate bottom plate after being turned over and folded;

a skylight is provided on the intermediate bottom plate;

the folding ladder is located at the skylight, and after the user reaches the skylight through the folding ladder, an activity area of the folding platform is assessable through the skylight.

17. A multifunctional double-layer lift-type vehicle-mounted tent, comprising a base frame, a first top frame, a second top frame, a linked lifting frame and a drive mechanism, wherein the base frame is used for mounting on an automobile; the first top frame is located above the base frame, and the second top frame is located above the first top frame; the linked lifting frame comprises a first scissor-type lifting frame and a second scissor-type lifting frame; a lower end of the first scissor-type lifting frame is pivotally connected to the base frame; an upper end of the second scissor-type lifting frame is pivotally connected to the second top frame; an upper end of the first scissor-type lifting frame is pivotally connected to a lower end of the second scissor-type lifting frame, and both are pivotally connected to the first top frame, so that the first scissor-type lifting frame and the second scissor-type lifting frame are linked;

the drive mechanism drives the first scissor-type lifting frame and the second scissor-type lifting frame of the linked lifting frame to be raised and unfolded or lowered and retracted, thereby driving the first top frame and the second top frame to be raised and unfolded or lowered and retracted relative to the base frame;

a detachable tent support frame for mounting a tent cloth is mounted on two opposite sides of the first top frame; the tent support frame comprises a fixing rod and several supporting rods rotating around one axis of the fixing rod; when the tent cloth needs to be installed, the supporting rods are unfolded outwards from the fixing rods to different angles for the tent cloth to be installed; and each of the supporting rods is folded towards the fixing rod to complete storage when the folding is required.

\* \* \* \* \*